United States Patent [19]

Brucat

[11] 4,123,153
[45] Oct. 31, 1978

[54] ADVANCE MECHANISM

[75] Inventor: John N. Brucat, Floral Park, N.Y.

[73] Assignee: Instructional/Communications Technology, Inc., Huntington Station, N.Y.

[21] Appl. No.: 766,712

[22] Filed: Feb. 8, 1977

Related U.S. Application Data

[63] Continuation-in-part of Ser. No. 664,145, Mar. 5, 1976, Pat. No. 4,053,214.

[51] Int. Cl.² .............................................. G03B 1/22
[52] U.S. Cl. ..................................... 352/191; 226/62; 226/67
[58] Field of Search ............... 352/191, 195, 196, 183, 352/194, 129; 226/62, 67

[56] References Cited

U.S. PATENT DOCUMENTS

| 3,264,051 | 8/1966 | Melton | 352/129 |
| 3,306,697 | 2/1967 | Nemeth | 352/194 |
| 3,507,569 | 4/1970 | Goto | 352/129 |

Primary Examiner—Monroe H. Hayes
Attorney, Agent, or Firm—Kane, Dalsimer, Kane, Sullivan & Kurucz

[57] ABSTRACT

An advance mechanism for perforated materials for advancing the material through a path of light. The mechanism includes a support structure adapted to be in line with a source of light so that light passes through an aperture in the support. The perforated material is supported and advanced along a pathway into and out of alignment with the aperture. A pawl mechanism including a spring is on the support adjacent to the aperture and normally positioned in a normally retracted position in alignment with a slot adjacent to the aperture in the support. Drive structure biases the spring and directs the pawl through the slot into engagement with a perforation in the material and then along the slot a predetermined distance to advance the material and then release the pawl permitting the spring to return the pawl to the retracted position out of the slot. The pawl is then returned to the normally retracted position. The movement of the pawl along the length of the slot is restricted. A rotatable drive cylinder is on the support and an integrally formed coupling extends therefrom. The coupling is adapted to be coupled directly to the drive shaft of a motor and to prevent relative rotation of the cylinder with respect to the shaft of the motor and thereby prevent slippage between the cylinder and the drive shaft of the motor.

8 Claims, 6 Drawing Figures

FIG. 4
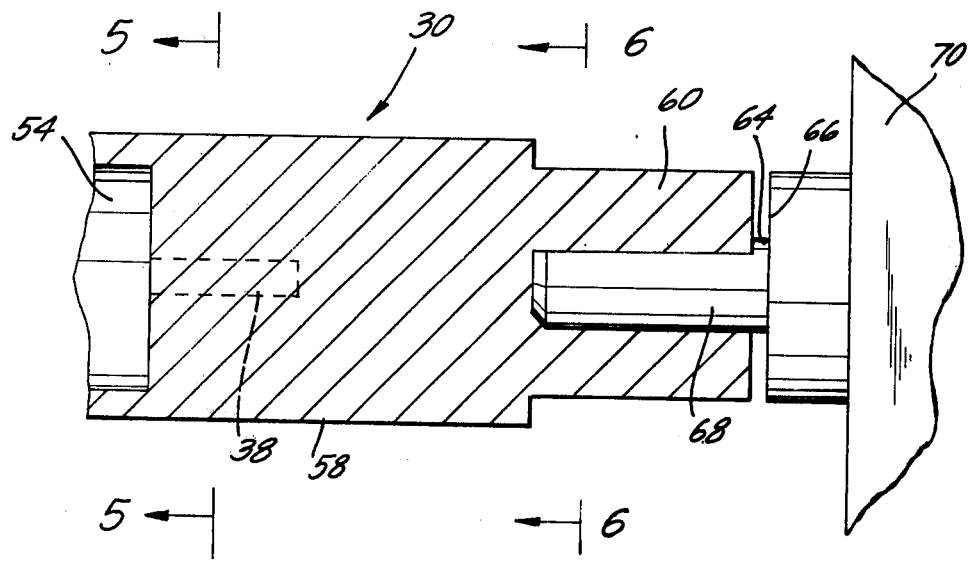
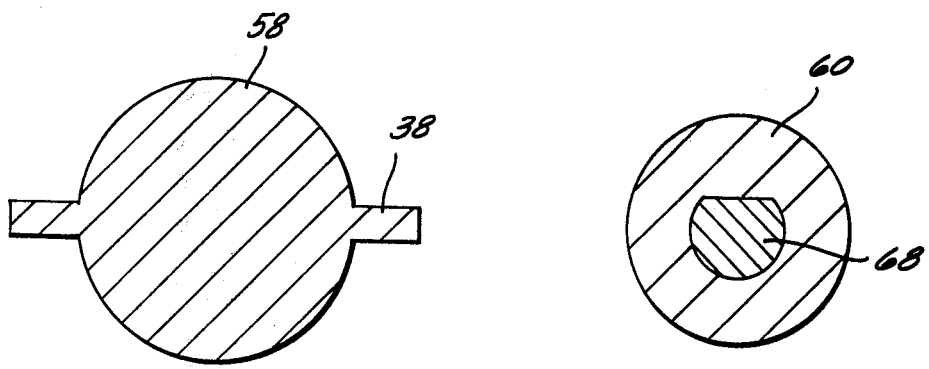
FIG. 5    FIG. 6

ADVANCE MECHANISM

CROSS-REFERENCE TO RELATED APPLICATION

This application is a continuation-in-part of my previously filed application Ser. No. 664,145, filed Mar. 5, 1976 for ADVANCE MECHANISM, now U.S. Pat. No. 4,053,214, the contents of which are incorporated herein by reference.

BACKGROUND OF THE INVENTION

There are numerous types of advance mechanisms presently in use to advance perforated materials in a sequential and time controlled manner into and out of a path of light. Of primary importance in the advancement of the perforated materials, such as film strips, is that of providing for dependability and reliability of repeated intermittent and accurate advancement in respect to a given distance.

In projection reading devices it is also important that the film be advanced in synchronization with the presentation of light and in this respect it is also necessary to provide for simultaneous stroking of the film for advancement purposes and a scanning of the exposed portion of film for controlled exposure of the materials contained thereon.

The advance mechanism should be of low cost containing a minimum number of components and should be versatile in that it can be used with a variety of different types of perforated materials such film, paper tape, timing charts and the like. The above referenced application is successful in achieving these objectives and naturally there is always room for further modified systems which also are successful in achieving the desired objectives for the advance mechanism.

SUMMARY OF THE INVENTION

With the above background in mind, it is one of the primary objectives of the present invention to provide an advance mechanism for use with a variety of types of perforated materials, such as those disclosed above, which is of low cost construction, utilizes a minimum number of components and operates dependably and efficiently in advancing the perforated material. The structure is designed to be adapted for use in simultaneous stroking and advancing of perforated material, such as film, so that the frames are presented in synchronization with light from a light source. The structure provides for simultaneous stroking or advancing of the film or other perforated material and scanning of the material by a moving aperture. A rotating member is provided with a helical aperture therein so that rotation of the member provides for a left to right scanning of the exposed frame containing lines of printed material by light from a light source passing through the rotating member. Additionally, an antislippage coupling structure is provided for direct connection between the shaft of the drive motor and the helical rotating member so that coordinated advancement of the perforated material and the rotating member is achieved in a uniform and consistent manner. To minimize manufacturing and assembly cost, the rotating member containing the helical aperture is integrally formed with the coupling structure so that a one-piece element is provided to accomplish a multiplicity of functions.

In summary, an advance mechanism is provided for use with perforated material for advancing the material through a path of light. The advance mechanism includes a support structure adapted to be aligned with a source of light so that the light passes through an aperture in the support. An advance means is provided for directing the perforated material along a path way into and out of alignment with the aperture. A pawl mechanism including spring means is on the support adjacent to the aperture and is normally positioned in the normally retracted position in alignment with a slot adjacent the aperture in the support. Drive means is provided for cooperating with the film advance means and for biasing the spring in directing the pawl mechanism through the slot into engagement with a perforation in the material and then along a slot a predetermined distance to advance the material. Thereafter, the pawl mechanism is released permitting the spring to return the pawl to the retracted position out of the slot. Return means is responsive to the release of the pawl mechanism and retraction of the pawl through the slot to return the pawl to the normally retracted position. Finally, the drive means includes a rotatable drive cylinder is on the support and an integrally formed coupling extends therefrom. The coupling is adapted to be coupled directly to the drive shaft of a motor and to prevent relative rotation of the cylinder with respect to the shaft of the motor and thereby prevent slippage between the cylinder and the drive shaft of the motor.

With the above objectives among others in mind, reference is made to the attached drawings.

BRIEF DESCRIPTION OF THE DRAWINGS

In the drawings:

FIG. 4 is a fragmentary enlarged sectional view of the rotatable drive cylinder and integral coupling portion of the invention connected to the drive shaft of a motor;

FIG. 5 is a sectional end view thereof taken along the plane of line 5—5 of FIG. 4; and FIG. 6 is a sectional end view thereof taken along the plane of line 6—6 of FIG. 4.

DESCRIPTION OF THE PREFERRED EMBODIMENTS

Figure 1:
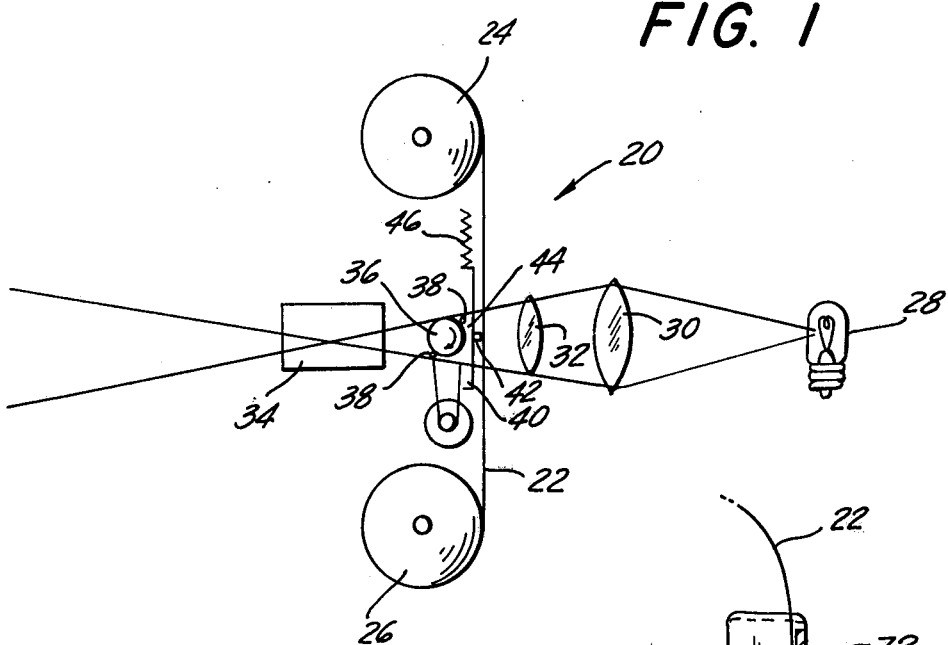
FIG. 1 is a schematic view of the advance mechanism shown in alignment with the light source.
Figure 3:
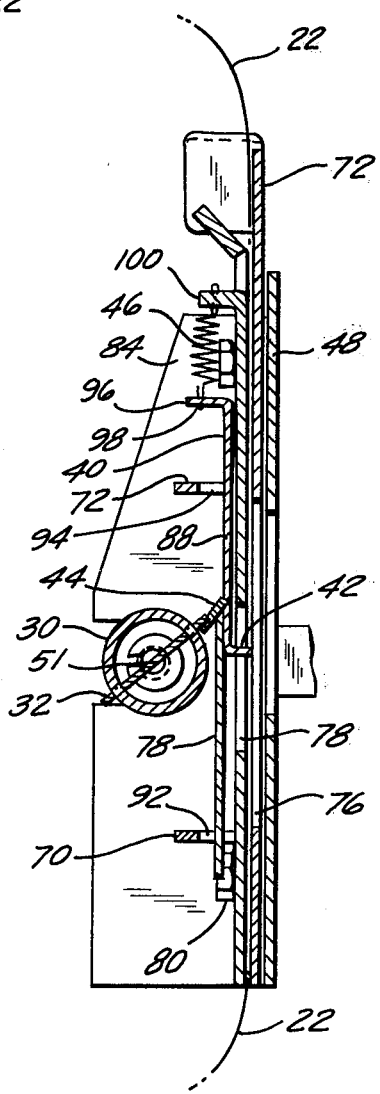
FIG. 3 is a side sectional view thereof taken along the plane of line 3—3 of FIG. 2.

Advance mechanism 20 is shown in schematic form in FIG. 1 as it would be positioned with respect to a strip of perforated material 22 extending from one reel 24 to a second reel 26. The advance mechanism 20 is mounted on a support structure with an appropriate aperture for passage of light therethrough. The aperture is aligned with a light source 28 from which light can be directed by appropriate condenser lenses 30 and 32 through the portion of the perforated material in alignment with the aperture in the support structure. The image is then projected from a projector lens 34 onto a projection screen for viewing purposes.

A rotating cylinder 36 having a pair of opposed projection cams 38 extending therefrom is provided in adjacent position to an elongated leaf spring 40. A pawl 42 for engaging the perforated material extends from one side of leaf spring 40 and an angularly extending drive projection 44 extends from the opposing side of spring 40. A helical return spring 46 is provided to return the leaf spring 40 to its initial position after stroking of the film.

In operation, rotation of the rotary cylinder 46 in the direction designated by the arrow in FIG. 1 causes cam 38 to contact angular projection 44 on leaf spring 40 and initially deflect the spring downward and direct the pawl 42 into engagement with a perforation in the perforated material. Cam 38 then drives projection 44 and the remainder of spring 40 with the captured perforated material forward in the direction of motion of rotary member 36 until cam 38 becomes disengaged with projection 44. At that point, the resiliency of leaf spring member 40 will permit it to return to its initial configuration withdrawing pawl 42 from the hole in the perforated material. Thereafter return spring 46 will compress to the relaxed position drawing the pawl and spring member 40 back to the initial position. Appropriate limit means are provided on both ends of the spring 40 to restrict movement thereof in the longitudinal direction. In this manner, the perforated material is advanced a predetermined distance. Further advancement is accomplished in the same fashion.

FIGS. 2–6 show the details of structure of advanced mechanism 20 as part of an overall projector structure employed to advance a strip of film upon demand. Advance mechanism 20 is adapted for use in connection with well known projection systems.

Figure 2:
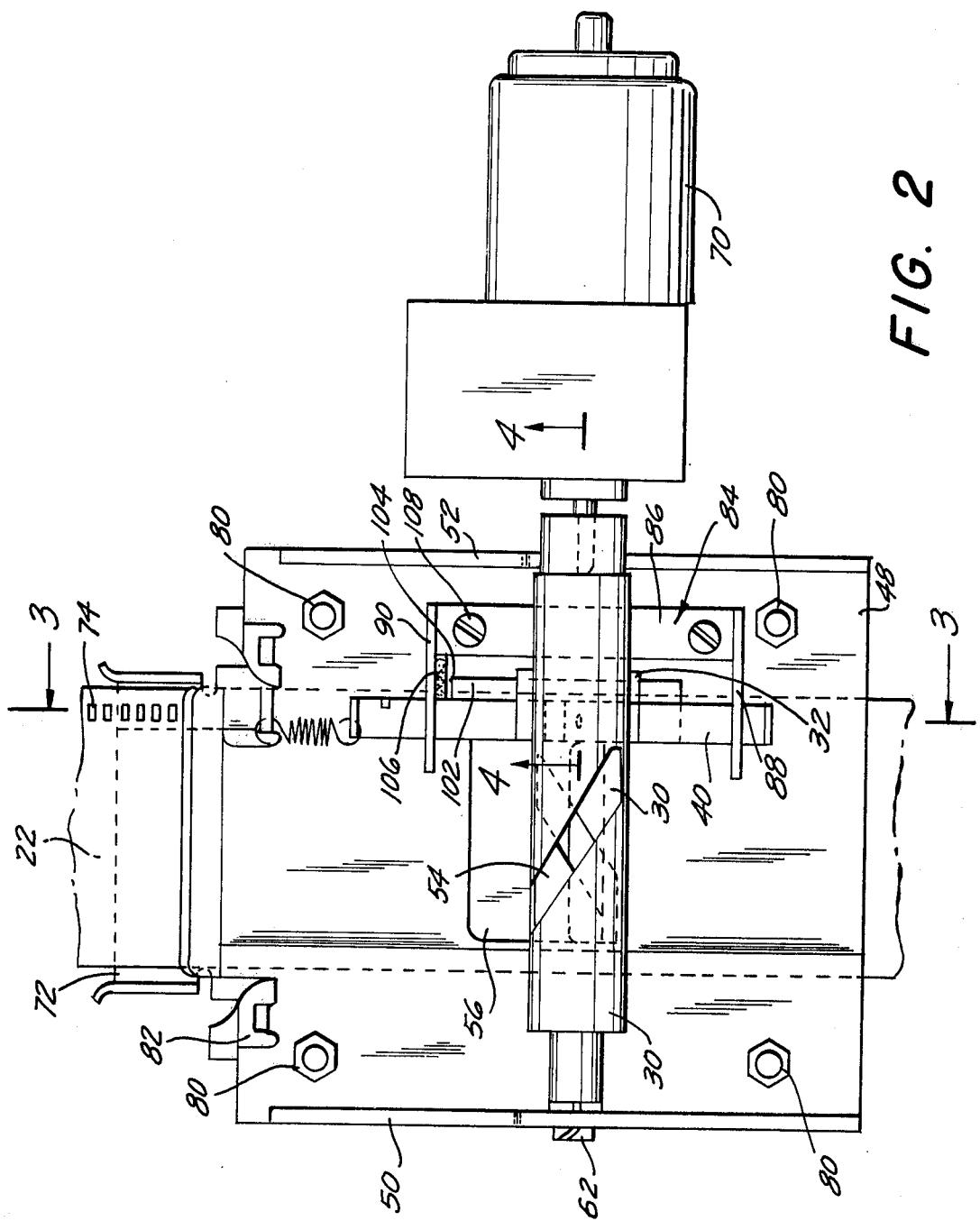
FIG. 2 is a front plan view of the advance mechanism of the invention shown connected to a drive motor and having a strip of perforated film passing therethrough.

As shown in FIG. 2, the support structure is in the form of a sheet metal rectangular base 48 having a pair of side walls 50 and 52 with the rotary member 30 in cylindrical form mounted on a pair of opposed openings in the side walls 50 and 52 so as to permit rotation of rotary member 30. The rotary member has a pair of opposed helical openings 54 which are designed to cooperate with a light source in blocking and permitting passage of light to a central aperture 56 in the support base 48 so as to advance the light beam from left to right across aperture 56.

Cylindrical member 30 is an integral one piece unitary element including a main cylinder portion 58 with a smaller diameter coupling projection 60 extending from one end and a small extension 62 extending from the other end. The unitary cylindrical member is formed in a conventional manner of a low cost material such as a plastic. For example, the member 30 can be formed of polypropylene molded into the desired configuration. Naturally, other inexpensive metal or plastic materials formed in other conventional low cost ways are also acceptable.

Extension 62 of cylindrical member 30 is rotatably mounted in a receiving opening in wall 50 and similarly, coupling projection 60 is rotatably mounted in a receiving slot in opposing side wall 52. The projections of cylindrical member 30 are held in the receiving slots in a conventional manner such as by their weight alone, friction or other conventional holding mechanisms as long as cylindrical member 30 in its integral entirety is permitted to rotate.

The larger diameter central cylinder 58 has the pair of opposed laterally extending cams 38 intermediate its ends and positioned to drive the pawl mechanism for advancing the film. Cams 38 extend from the exterior surface of cylindrical member 30 and are also integrally formed therewith. Alternatively, they can be fastened to member 30 in a conventional manner. Helical openings 54 form through apertures for passage of light as cylinder 58 rotates.

A D-shaped recess 64 extends inwardly from the outer edge 66 of coupling projection 60. The D-shaped recess is dimensioned to receive the D-shaped shaft portion 68 of a conventional drive motor 70. The D-shaped interengagement of the shaft surface and the walls forming recess 64 in coupling projection 60 prevents relative rotation between the cylindrical member 30 and the drive shaft of the motor thereby providing a direct coupling and alleviating the danger of slippage between the cylindrical rotary member 30 and the drive means thereby maintaining controlled movement of the film to the desired degree upon demand. In this manner, synchronization is provided between the scanning effect of the helical apertures as achieved by a rotation of the rotary member 30 in alignment with the source of light and appropriate advancement of the frames of the film. The result is a controlled scanning of the material on an individual frame and suitable advancement at the appropriate time with the helical openings being simultaneously rotated so as to provide continuous scanning of the frames of the film as they are brought into alignment with the aperture in the source of light.

The general supporting and surrounding structure for cylindrical member 30 can be the same as that depicted and described in the above referenced application. The support structure has a guideway formed by a slidable bottom plate 72 coupled with the underside of the base 48 at a location containing a recessed central portion so as to form a pathway along base 48 for directing a film strip 22 into and out of alignment with aperture 56 which in turn is aligned with the guideway formed by plate 72 and base 48. The film has a plurality of sprocket holes 74 along one edge which are positioned so as to be brought into alignment with an appropriate slot adjacent to aperture 56 and formed by the combined aligned slots 76 and 78 in the plate 72 and base 48. The components of the support structure are fashioned in a conventional manner such as by screws and nuts 80 as shown. Appropriate spacers 82 are employed to assure proper alignment for the pathway provided by the mated plates for purposes of advancement of film 22.

The pawl mechanism includes a saddle bracket 84 with an elongated central base portion 86 terminating in a pair of opposed end walls 88 and 90. The end walls are upright in configuration and extend laterally from the base portion 86 and include aligned notches 92 and 94 for receipt therethrough of an elongated leaf spring member 40. The leaf spring member 40 is of resilient material such as spring steel to provide the necessary resilience for operation of the pawl mechanism. One end of the leaf spring member 40 includes an upstanding tab 96 with a notch or opening 98 therein. One end of helical spring 46 is attached to tabs 96 through opening 98 and the other end of spring 46 is attached to an upstanding tab 100 on base 48 which also has a receiving orifice therein. In this manner the longitudinal axis of helical spring 46 is substantially aligned with the longitudinal axis of the leaf spring member 40. Extending laterally from leaf spring member 40 is a stop portion 102 which is shorter in length than the remainder of spring 40 and is spaced from both ends thereof. One end of stop portion 102 terminates in an upstanding tab 104 which is positioned for interengagement with a receiving pad 106 on end wall 90 of the bracket. A large contact area provided between the broad tab 104 and the receiving tab 106 facilitates the production of a positive stopping interengagement and reduces the danger of wear of parts since the stopping force is distributed over a large area.

When spring 40 is extended through openings 92 and 94 in the walls of the sadle bracket, the stop portion 102 will engage with end wall 90 to limit axial movement in one direction and the other end of stop portion 102 engages with wall 88 to limit axial movement in the other direction. Thus, the axial travel of the pawl mechanism is determined. If desired, a pad and upstanding tab arrangement can be positioned on the engaging surfaces at that end of the stop as described in connection with the engaging surface at the other end of stop 102. Alternatively, the upstanding tab and pad can be eliminated from both ends with engagement being obtained between the leading edges of the stop 102 and the walls 88 and 90 at the respective ends of the travel path.

On one side of leaf spring 40 is downwardly extending pawl 42 which is designed for interengagement with the sprocket holes 74 in film 22. Spring member 40 can flex disengaging pawl 42 from the film perforations to prevent damage to the film such as when the film is manually pulled, or when a perforation is not vertically aligned to receive the pawl. Somewhat aligned with the pawl 42 on the opposite side of spring 40 is angular extending upward projection 44 which forms a flexible shoulder for engagement with cams 38 of cylinder 58.

In general, the elongated leaf spring 40 is positioned in slots 92 and 94 of sadle bracket 84 and the sadle bracket is mounted to base 48 at the appropriate location by means of conventional fasteners such as screw and nut assemblies 108. Elongated spring member 40 is then in position to be attached at one end to helical spring 46 which is mounted to tab 100 on base 48. Axial movement of spring 40 is limited by the spacing between end walls 88 and 90. Pawl 42 is positioned in alignment with slot arrangement 76 and 78 in the support assembly in position to be inserted in a sprocket hole in the roll of sprocket holes 74 of film 22.

Cylindrical member 30 is then positioned in the appropriate receiving slot in side walls 50 and 52 which puts cams 38 in alignment for engagement with upwardly extending projection 44. The entire mechanism 20 can then be mounted in an appropriate projector with aperture 56 and the aligned helical openings in the rotary member aligned with the source of light. The drive motor assembly is coupled with the coupling projection 60 of rotary member 30 by interconnection between the D-shaped opening therein and the D-shaped drive shaft of the motor as described above.

Operation of the advance mechanism is the same as that described above in connection with the schematic view of FIG. 1. With the source of light showing through helical opening 54 and through aperture 56 upon the exposed frame of the film, the drive means is operated upon demand to rotate rotatable cylinder 30 and integral cams 38 into engagement with the drive projection 44 on spring 40, forcing the spring downward and the pawl into a sprocket hole and then advancing the spring and film. Rotation of rotary member 30 causes a cam 38 to exert initially a downward force on projection 44 so as to deflect spring 40 and force pawl 42 through aligned apertures 76 and 78 and into registration with a sprocket opening 74 in film 22. Continued rotation of rotary member 30 and cam 38 causes a forward force to be applied to projection 44 thereby sliding spring 40 forward. This action advances pawl 42 and interengaged film 22 forward until the cam becomes disengaged with projection 44 because further forward motion of spring 40 is prohibited by engagement between the end of the stop and the wall 88 of the sadle bracket. The cam 38 then eventually passes beyond projection 44 out of engagement therewith thereby permitting the spring to return to the relaxed position wth pawl 42 withdrawing from the sprocket hole in film 22 and back through aligned apertures 76 and 78.

Thereafter, as rotary member 30 continues to rotate independent of spring 40, return spring 46 which forms the return means withdraws back toward its relaxed position thereby axially returning spring 40 to its normally and initial retracted position.

It should be noted that the forward motion of spring 40 as caused by cam 38 causes a biasing of spring 46 and the ultimate release of the projection will permit spring 46 to return to its initial position thereby drawing spring 40 back to the initial retracted position. The pawl mechanism and spring are then ready to receive a further force exerted by the next cam 38 to retract the advancement of the film again the predetermined distance bringing a further frame of film into alignment with aperture 56.

The return action of spring 46 withdraws spring 40 until the end of stop 102 engages with wall 90. Accordingly, the travel distance of spring 40 and accordingly pawl 42 and film 22 on any individual stroke is controlled by the distance between the length of stop 102 and the distance between end walls 88 and 90. Accordingly, there is no variation in travel distance and there is no danger of over or under advancement of the film on each particular stroke. This is advantageous when one desires simultaneous stroking of the film and scanning of the subject matter on each individual frame by means of the helical opening 54 in rotating member 30. This positive travel distance is enhanced by the prevention against slippage between rotating member 30 and the shaft of the drive motor as described above.

It is also contemplated that a drag spring, not depicted, as described in the above referenced application, can be provided to keep the film from moving between the advance stroke. It would be positioned to engage the underside of the film and force it upward against the support. It would also serve to position and guide the perforated edge of the film toward the pawl and achieve a more positive interengagement therewith. This alleviates the danger of a thin film floating within a larger lateral area of free movement and possible failure of the pawl to mate with a sprocket hole. The drag spring would also serve to keep the film from moving during other stages of operation.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. An advance mechanism for perforated materials for advancing the material through a path of light comprising:

A support structure adapted to be in line with a source of light so that light passes through an aperture in the support;

material support and advance means for directing the perforated material along the pathway into and out of alignment with the aperture;

a pawl mechanism including spring means on the support adjacent to the aperture and normally positioned in a normally retracted position in alignment with a slot adjacent to the aperture in the support;

drive means for cooperating with the material advance means and for biasing the spring and directing the pawl mechanism through the slot into engagement with a perforation in the material and then along the slot a predetermined distance to advance the material and then releasing the pawl mechanism permitting the spring to return the pawl to the retracted position out of the slot;

return means responsive to release of the pawl mechanism and retraction of the pawl through the slot to return the pawl to a normally retracted position;

limit means positioned on the support and on the pawl mechanism to restrict the distance of movement of the pawl mechanism along the length of the slot;

the drive means including a rotatable drive cylinder on the support and an integrally formed coupling extending therefrom, the coupling adapted to be coupled directly to the drive shaft of a motor and to prevent relative rotation of the cylinder with respect to the shaft of the motor and thereby prevent slippage between the cylinder and the drive shaft of the motor;

the pawl mechanism including an elongated leaf spring mounted on the support and having a downwardly extending pawl in alignment with and in position for extension through the slot in the support, a drive projection extending from the leaf spring and in position for engagement by a portion of the drive means, the elongated leaf spring being movably positioned on the support so that engagement of the drive means with the drive projection and application of a force thereto will bias the leaf spring until the pawl extends through the slot into engagement with a perforation in the perforated material and then the leaf spring will be moved by the drive means and the perforated material accordingly advanced, and when the drive means is disengaged from the leaf spring, the leaf spring will return to its initial configuration with the pawl disengaged from the perforated material and withdrawn through the slot in the support whereupon the return means can return the leaf spring to the normal retracted position;

the drive projection on the elongated member being an upwardly extending prong which extends in the direction of movement of the elongated member when subjected to a force from the drive means; and the drive cylinder including at least one helical aperture therethrough in alignment with the aperture in the support.

2. The invention in accordance with claim 1 wherein the coupling is a tubular extension with a D-shaped opening in the end for reception of a D-shaped extension of a motor shaft therein and thereby preventing relative rotation therebetween.

3. The invention in accordance with claim 1 wherein the cylinder and integral coupling is formed of a molded plastic material.

4. The invention in accordance with claim 3 wherein the cylinder and the integral coupling is formed of polypropylene material.

5. The invention in accordance with claim 1 wherein at least one drive cam extends from the outer cylindrical surface of the drive cylinder and is in alignment with the drive prong on the surface of the leaf spring, whereupon the actuation of the drive means to rotate the cylinder will bring the cam into engagement with the drive prong and initially bias the leaf spring member downward to engage with the perforated material and then continued rotation of the cylinder will slide the leaf spring with respect to the slot thereby advancing the perforated member until continued rotation of the cylinder brings the drive cam out of engagement with the leaf spring member.

6. The invention in accordance with claim 5 wherein each helical aperture is arranged with respect to each projecting drive cam on the cylinder so that as the drive cam drives the leaf spring and advances the perforated member, the helical opening will permit passage of light through the tubular member and through the aperture in the support so that the material on the advanced perforated member will be scanned from left to right by light from the light source in a simultaneous manner.

7. The invention in accordance with claim 6 wherein there are two spaced helical apertures about the circumference of the cylinder and two spaced drive cams extending from the outer surface of the cylinder.

8. The invention in accordance with claim 1 wherein the perforated material is a film strip having individual frames containing subject matter to be observed and a row of perforations along one edge thereof to be positioned in alignment with the slot for engagement with the pawl mechanism.

* * * * *